(12) United States Patent
Sanford, Jr. et al.

(10) Patent No.: US 11,979,648 B2
(45) Date of Patent: May 7, 2024

(54) SECURITY PLANTER DEVICE

(71) Applicant: Sammie James Sanford, Jr., Fairborne, GA (US)

(72) Inventors: Sammie James Sanford, Jr., Fairborne, GA (US); Javie Carlton Peaks, Palmetto, GA (US)

(*) Notice: Subject to any disclaimer, the term of this patent is extended or adjusted under 35 U.S.C. 154(b) by 0 days.

(21) Appl. No.: 18/183,137

(22) Filed: Mar. 13, 2023

(65) Prior Publication Data
US 2023/0336851 A1    Oct. 19, 2023

Related U.S. Application Data

(60) Provisional application No. 63/319,263, filed on Mar. 11, 2022.

(51) Int. Cl.
*H04N 23/51* (2023.01)
*A01G 9/02* (2018.01)
*H04N 7/18* (2006.01)

(52) U.S. Cl.
CPC ............ *H04N 23/51* (2023.01); *A01G 9/028* (2013.01); *H04N 7/185* (2013.01)

(58) Field of Classification Search
CPC ... A01G 9/02; F21V 33/0028; F21V 2200/10; H04N 23/50; F21W 2121/00; G08B 13/19619; G08B 15/001

USPC .......................................................... 348/143
See application file for complete search history.

(56) References Cited

U.S. PATENT DOCUMENTS

| | | | | |
|---|---|---|---|---|
| 2015/0206405 A1* | 7/2015 | Sanford, Jr. | ......... | G08B 15/001 348/151 |
| 2017/0305594 A1* | 10/2017 | Kasha | ..................... | B65D 11/20 |
| 2021/0227183 A1* | 7/2021 | Swiss | ..................... | H04N 7/183 |

* cited by examiner

*Primary Examiner* — Masum Billah
(74) *Attorney, Agent, or Firm* — Steven C. Stewart

(57) ABSTRACT

A security planter having a camera embedded in a planter to capture and transmit images is disclosed. In some implementations, the device may include a flowerpot having a side wall with an opening, the flowerpot configured to contain a plant and soil. In addition, the device may include a camera device encased within a first housing, the first housing integrally attached to an inner side of the side wall, the camera device configured to capture one or more images of objects disposed adjacent the flowerpot and viewed through the opening, the camera device having wireless transmission circuitry to transmit the one or more images of the captured object. The device may include a power supply disposed in a cavity between a bottom floor and a bottom panel of the flowerpot. Moreover, the device may include a wire extending along the inner side wall to electrically couple the power supply to the camera device.

13 Claims, 4 Drawing Sheets

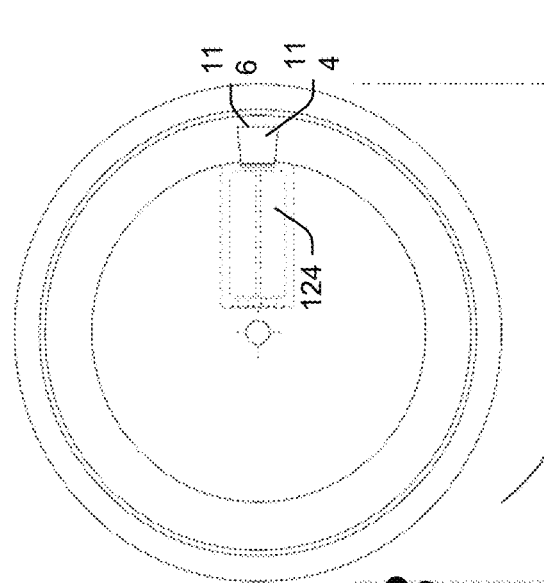
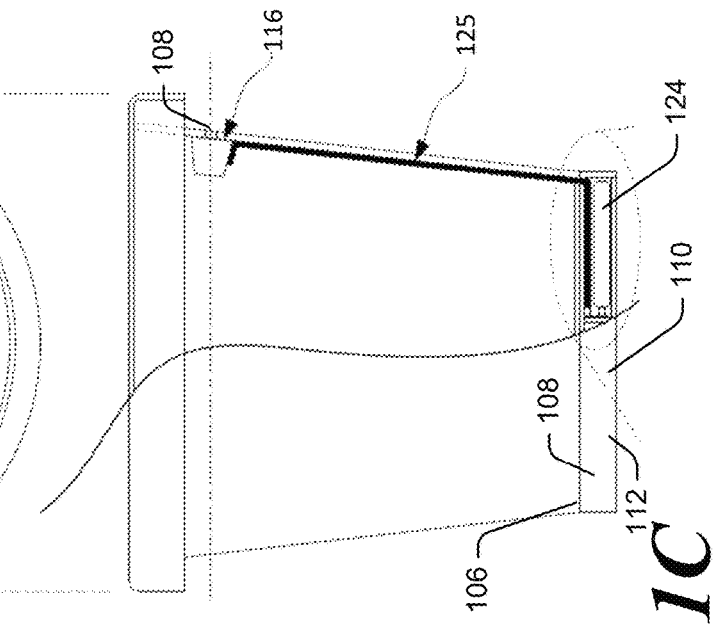
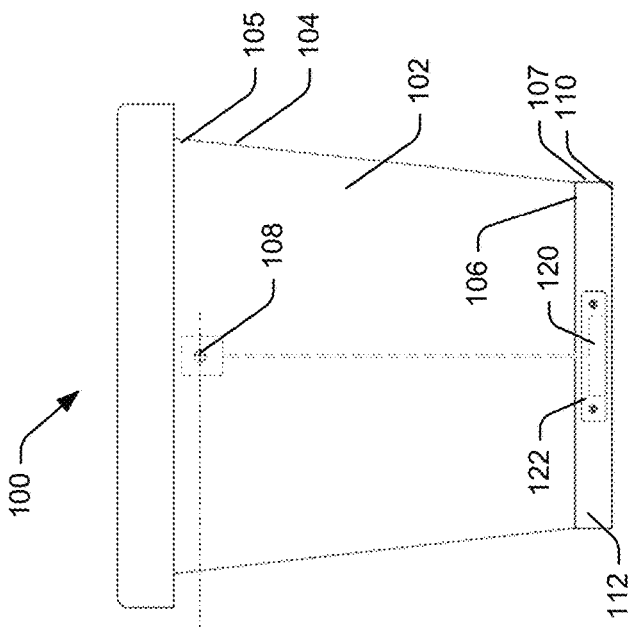
Fig. 1B
Fig. 1C
Fig. 1A

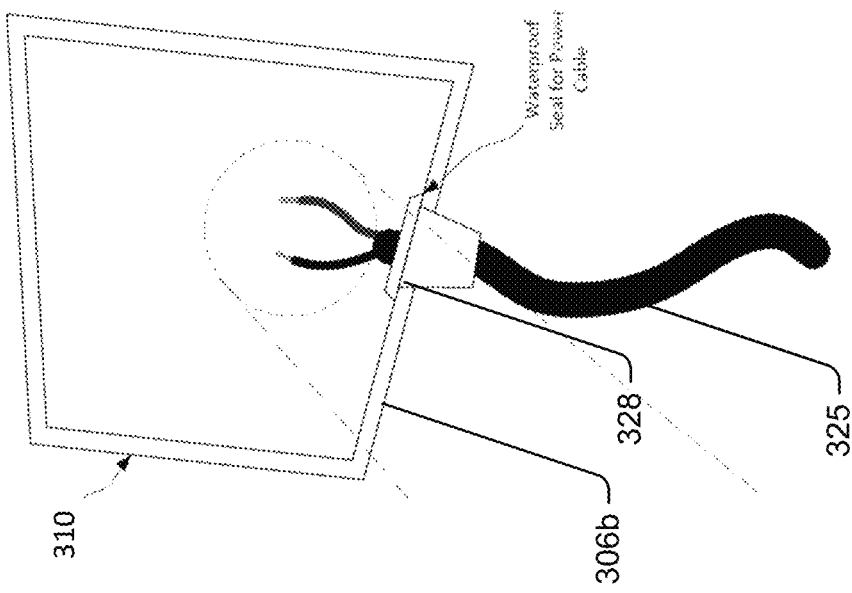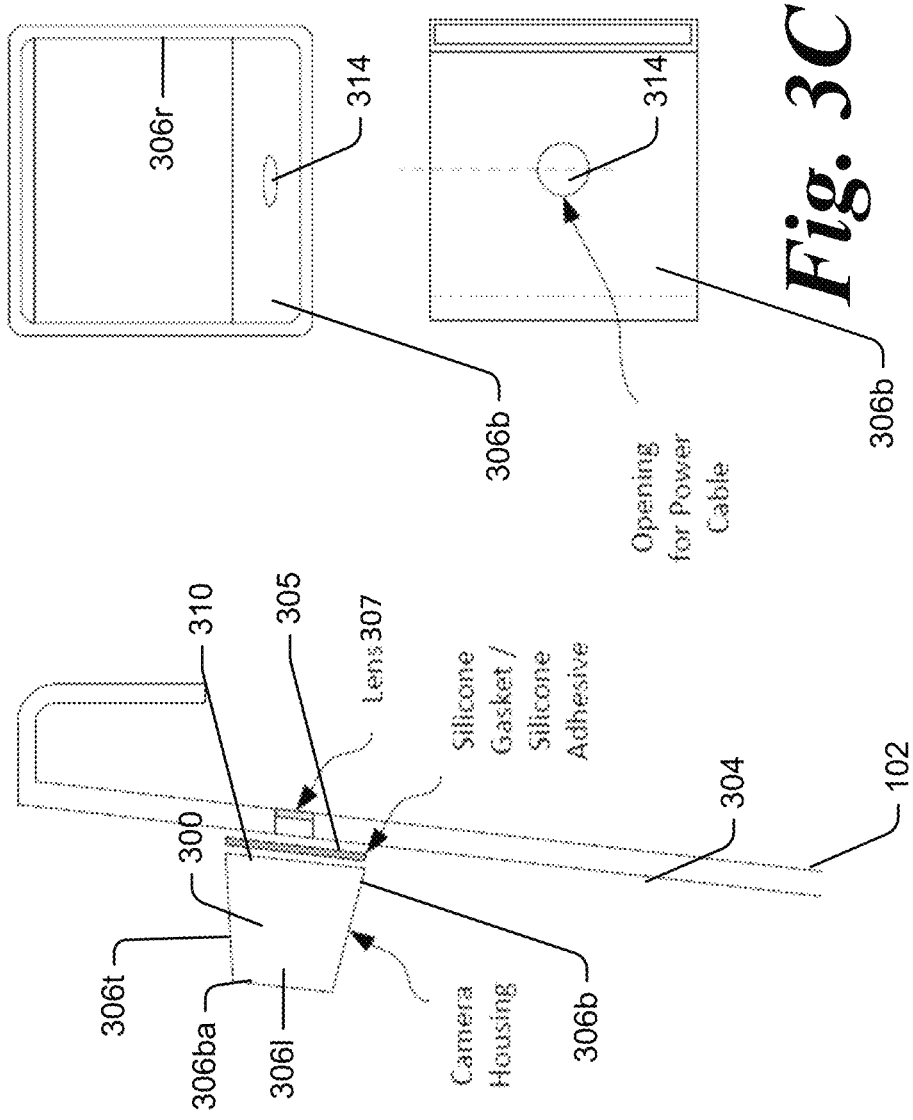

SECURITY PLANTER DEVICE

TECHNICAL FIELD

These claimed embodiments relate to a security planter device.

BACKGROUND OF THE INVENTION

A security planter device is disclosed.

Security devices which often include a camera or other motion sensors have been used to monitor homes and business offices. Such devices are often hidden in plain view or located in objects such as a book or other type of enclosures. The devices are susceptible to moisture or the elements resulting in a degradation over time if exposed to moist air. Further these devices appear to track objects, pets or persons in one directions, and once the object moves around the device the object is no longer tracked.

SUMMARY OF THE INVENTION

In one general aspect, a security planter device may include a flowerpot having a side wall with an opening, the flowerpot configured to contain a plant and soil. A security planter device may also include a camera device encased within a first housing, the first housing integrally attached to an inner side of the side wall, the camera device configured to capture one or more images of objects disposed adjacent the flowerpot and viewed through the opening, the camera device having wireless transmission circuitry to transmit the one or more images of the captured object. A security planter device may furthermore include a power supply disposed in a cavity between a bottom floor and a bottom panel of the flowerpot. A security planter device may in addition include a wire extending along the inner side wall to electrically couple the power supply to the camera device. Other embodiments of this aspect include corresponding computer systems, apparatus, and computer programs recorded on one or more computer storage devices, each configured to perform the actions of the methods.

Implementations may include one or more of the following features. The security planter device as recited in where the bottom panel is disk shaped and is configured to couple with the inner wall and engage with a seal disposed along an outside perimeter of the bottom panel to prevent water from leaking into the cavity. The security planter device as recited in where the flowerpot forms a shape of a frustrum of a cone, with a bottom of the frustrum forming the floor and a top of the frustrum forming a circular rim. The security planter device as recited in where the side wall tapers from the rim to the floor. The security planter device as recited in where the first housing surrounds the camera device on a back side, top side, a bottom side, a left side, a right side, and the bottom side of the first housing slopes downward. The security planter device as recited in where the wireless transmission circuitry is configured to transmit the one or more images of the captured object in response to a movement of the one or more objects or in response to a controller to signal provided the camera device to capture the one or more objects. The security planter device as recited in where the power supply is removably coupled to the bottom floor and is configured to be slidably removed through a closable opening in the wall of the flowerpot disposed between the bottom floor and the bottom panel. The security planter device as recited in where the wire is embedded in the wall of the flowerpot. Implementations of the described techniques may include hardware, a method or process, or a computer tangible medium.

In one general aspect, a method for monitoring a room may include providing a flowerpot having a side wall with an opening. A method for monitoring a room may also include placing a plant and associated soil in the flowerpot. A method for monitoring a room may furthermore include encasing a camera device within a first housing. A method for monitoring a room may in addition include integrally attaching the first housing to an inner side of the side wall. A method for monitoring a room may moreover include capturing with a camera device one or more images of objects disposed adjacent the flowerpot and viewed through the opening. A method for monitoring a room may also include transmitting with wireless transmission circuitry in the camera device the one or more images of the captured object. A method for monitoring a room may furthermore include disposing a power supply in a cavity between a bottom floor and a bottom panel of the flowerpot. A method for monitoring a room may in addition include electrically coupling the power supply to the camera device via a wire extending along the inner side wall. Other embodiments of this aspect include corresponding computer systems, apparatus, and computer programs recorded on one or more computer storage devices, each configured to perform the actions of the methods.

Implementations may include one or more of the following features. The method as recited further may include surrounding the camera device with a wall on a back side, top side, a bottom side, a left side, and a right side, and sloping downward the wall on the bottom side of the first housing. The method as recited further may include transmitting with wireless transmission circuitry in the camera device the one or more images of the captured object in response to a movement of the one or more objects. The method as recited further may include signaling with a controller the camera device to capture the one or more objects in response to a movement of the one or more objects. The method as recited further may include: removably coupling the power supply to the bottom floor; and slidably removing the power supply through a closable opening in the wall of the flowerpot disposed between the bottom floor and the bottom panel. Implementations of the described techniques may include hardware, a method or process, or a computer tangible medium.

In one general aspect, a security planter device may include a flowerpot having a side wall with a plurality of camera openings, the flowerpot forming a shape of a frustrum of a cone, with a bottom of the frustrum forming a floor and a top of the frustrum forming a circular rim, where the side wall tapers from the rim to the floor, the flowerpot configured to contain a plant and associated soil. A security planter device may also include a plurality of camera devices each encased within a housing, where the housing surrounds the camera device with a back side wall, a top side wall, a bottom side wall, a left side wall, and a right side wall, the housings integrally attached to an inner side of the side wall, the camera devices configured to capture one or more images of objects disposed adjacent the flowerpot and viewed through the camera openings, the camera devices having wireless transmission circuitry to transmit the one or more images of the captured object in response to a movement of the one or more objects, in response to a controller to signal the camera devices to capture the one or more objects. A security planter device may furthermore include a power supply removably coupled to the floor and configured to be slidably removed through a closable opening in the wall of the flowerpot disposed between the bottom floor and the bottom panel, the power supply coupled with a bracket attached to the bottom floor and disposed in a cavity between a bottom floor and a bottom panel of the flowerpot. A security planter device may in addition include at least one wire extending along the inner side wall to electrically couple the power supply to the camera devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIGS. 1A-1C are front side, right side and top side plan views of a security planter device;

FIGS. 3A-3D are right side, front side, bottom side and a cross sectional side view of housing for holding the camera device.

DETAILED DESCRIPTION

Figure 2A:
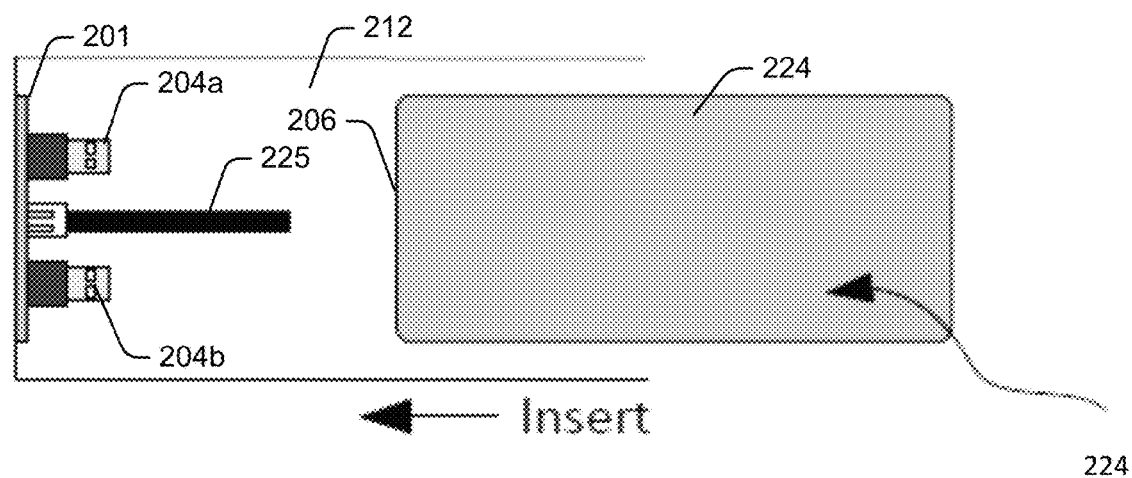
FIGS. 2A-2B are right side and top side plan views of a power source compartment for the security planter device.

Referring to FIGS. 1A-C there is shown a security planter device 100. The security planter device 100 includes a flowerpot 102 which can hold a plant and associated soil. Flowerpot 102 is preferably shaped as a frustrum of a cone with a tapered inner side wall 104 having a top edge or circular rim 105 and a frustrum bottom 107. Adjacent bottom 107, flowerpot 102 includes a disk-shaped flat bottom floor 106 and a disk shaped flat bottom panel 110 disposed below floor 106. Floor 106, wall 104 and panel 110 form a cavity 112. Outside edges along a perimeter of floor 106 is sealed against side walls 104 of flowerpot 102 to prevent water leaking into the cavity 112. Disposed on wall 104 adjacent flowerpot top edge rim 105 is a camera opening 108.

A camera device 114 is encased within a first housing 116 to monitor a room. The first housing 116 is integrally attached to the inner side wall 104 of the flowerpot 102 adjacent camera opening 108 and surrounds camera device 114. Cavity 112 has an opening 120 on side wall 104 with a removable panel 122.

A power supply 124 is disposed in cavity 112 and is removably mounted between a bottom floor 106 and a bottom panel 110 of the flowerpot 102. A wire 125 extends along the inner side wall 104 (or may be embedded in the wall) to electrically couple the power supply 124 to the camera device 114. Preferably power supply 124 is removable from flowerpot 102 through closable opening 120 in side wall 104 and within cavity 112.

The camera device 114 has embedded wireless transmission circuitry to transmit to an external device (e.g., a smart phone, personal computer, personal device assistant, or cloud computing device) with a signal containing one or more images of the captured object via wireless network or wireless connection (e.g., Bluetooth, WIFI, near field communications or other know wireless communications channels). Such signal may be sent in response to movement detected by the camera or in response to a signal provided by a controller. During operation the camera device 114 captures one or more images of objects disposed adjacent the flowerpot 102 visible to camera device 114 through the camera opening 108.

Figure 2B:
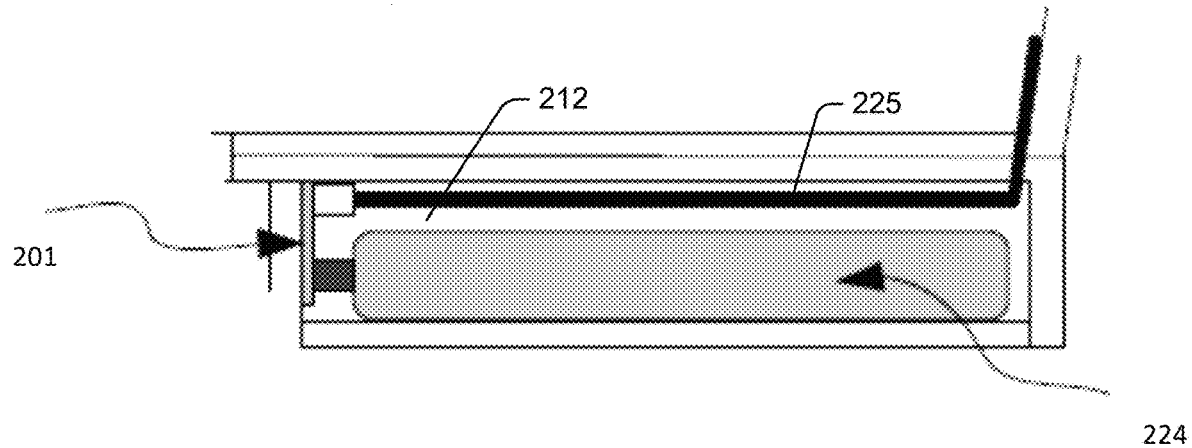

Referring to FIGS. 2A-2B, there is shown a slidably removable power supply 224 (power supply 124 in FIGS. 1A-1C) within cavity 212. Power supply 224 includes a receptor 206 to engage with connector 204a and 204b coupled with circuit board 201 in flowerpot 102 (FIGS. 1A-1C). Connectors 204a and 204b are attached to wire 225 (wire 125 of FIGS. 1A-1C) that electrically connects to camera device 114 (See FIGS. 1A-1C).

Referring to FIG. 3A-3D, there is shown camera housing 300 (first housing 116 of FIG. 1A) mounted to inner side wall 304 of flowerpot 102. Camera housing 300 has a connected bottom side wall 306b, a top side wall 306t, has a right side wall 306r, a back side wall 306ba and a left side wall 306l to form a housing 300 with an opening 308 on the housing 300 front side. Embedded within camera housing 300 is the camera device (114 of FIG. 1A) with a lens 307. Although one camera and housing is shown the flowerpot 102 may have multiple cameras within multiple housings that are each spaced and mounted at multiple locations around the inner wall of flowerpot 102 to provide a 360 degree monitoring of objects and movement around the flowerpot 102. If the flowerpot 102 has multiple cameras it may have multiple camera openings (at positions previously described on the flowerpot 102) through which the multiple cameras are directed to view objects around the flowerpot 102.

The right, left, top and bottom side walls 306r, 306l 306t, and 306b are preferably flat and have a bottom edge 310 with a surface that is integrally coupled to wall 304 using a silicone gasket/silicon adhesive 305, or any type of water-resistant adhesive material. Bottom side wall 306b has a small opening 314 through which power cable 325 (Wire 125 of FIGS. 1A-1C) can be inserted to connect to camera device 114 (FIGS. 1A-1C). Preferably a waterproof sealant material 328 is engaged with bottom side wall 306b around opening 314. Power cable 325 may be inserted through opening 314 while engaging with waterproof sealant material 328 to form a waterproof seal.

Preferably a plane of top side wall 306t is angled downward (at an angle greater than zero) with respect to the horizon when camera housing 300 is mounted to inner side wall 304. By mounting the plane of top side wall 306t sloped downward, water in flowerpot 102 is prevented from gathering on top side wall 306t. In one implementation, the inside angles of camera housing are 99.2 degrees for the angle between the back side wall 306ba and the top side wall 306t, and between the back side wall 306ba and the bottom side wall 306b. The inside angle between the top side wall 306t and the inner side wall 304, and between the bottom side wall 306b and the inner side wall 304 is preferably 80.8 degrees.

Figure 4:
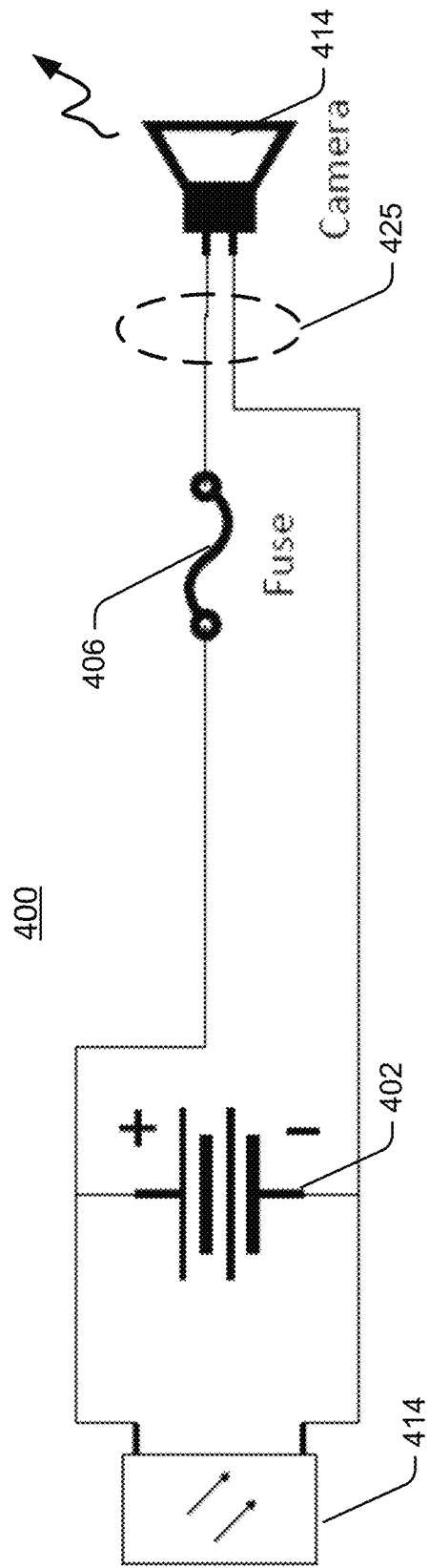
FIG. 4 is simplified schematic diagram of the camera device and its power source.

Referring to FIG. 4, there is shown a schematic diagram of the security device 400. Security planter device 400 includes a power supply 402 (e.g., a power source, such as an internal battery or external DC source) (power supply 402 is shown as removable power supply 224 in FIGS. 2A-2B) coupled with the camera device 414 (camera device 114 shown in FIGS. 1A-1B) via cable/wire 425. A fuse 406 may be placed between power supply 402 and camera device 414.

Although a battery is shown as the power supply 402 to supply power, optionally power may be supplied to camera via an external direct current (DC) power supply 402 (e.g., solar power device, AC (alternating current)-DC (direct current) supply, USB (universal serial bus) DC power supply).

Camera device 414 includes a generally known camera and embedded wireless transmitter/controller. Camera device 414 may be able to trigger on motion detection and send a signal containing the imaged viewed by the camera wirelessly to a receiver via a wireless communications network. The communications network may be a wireless ethernet network, telecommunications network or a Bluetooth network. The receiver may be located on a local wireless network for storage/viewing/retransmission (such as a PC (personal computer), PDA (personal device assistant), Phone or gateway) or disposed remotely via an internet connection (Such as a remote server or other storage capable communications device).

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A security planter device comprising:
   a flowerpot having a disk shaped bottom panel and a side wall forming an opening extending through the side wall, the flowerpot having a floor coupled to the side wall forming a cavity with the bottom panel and configured to support a plant and soil in the flowerpot;
   a camera device encased within a first housing, the first housing integrally attached to an inner side of the side wall, the camera device configured to capture one or more images of objects disposed adjacent the flowerpot and viewed through the opening extending through the side wall, the camera device having wireless transmission circuitry to transmit one or more of the captured images of the objects;
   a power supply disposed in the cavity between the floor and the bottom panel of the flowerpot; and
   a wire extending along the side wall to electrically couple the power supply to the camera device,
   wherein the bottom panel couples with the side wall along an outside perimeter of the bottom panel, engages with a seal disposed along the outside perimeter of the bottom panel to prevent water from leaking into the cavity and onto the power supply, and includes an opening to enable the wire to extend from the power supply to the camera device.

2. The security planter device as recited in claim 1, wherein the flowerpot side wall is formed in a shape of a frustrum of a cone, with a bottom of the frustrum coupled with the floor and a top of the frustrum forming a circular rim, and wherein the opening is disposed on the frustrum of the cone between the circular rim and the floor.

3. The security planter device as recited in claim 2, wherein the side wall tapers from the circular rim to the floor.

4. The security planter device as recited in claim 1, wherein the first housing surrounds the camera device on a back side, top side, a bottom side, a left side, a right side, and wherein the bottom side of the first housing slopes downward.

5. The security planter device as recited in claim 1, wherein the wireless transmission circuitry is configured to transmit the one or more images of the captured object a) in response to a movement of one or more objects, or b) in response to a controller to signal provided the camera device to capture the one or more objects.

6. The security planter device as recited in claim 1, wherein the power supply is removably coupled to the bottom floor and is configured to be slidably removed through a closable opening formed in the side wall of the flowerpot in the cavity disposed between the floor and the bottom panel.

7. The security planter device as recited in claim 1, wherein the wire is embedded in the side wall of the flowerpot.

8. A method for monitoring a room comprising:
   providing a flowerpot having a side wall forming an opening therein;
   placing a plant and associated soil in the flowerpot;
   encasing a camera device within a first housing,
   integrally attaching the first housing to an inner side of the side wall;
   capturing with a camera device one or more images of objects disposed adjacent the flowerpot and viewed through the opening,
   transmitting with wireless transmission circuitry in the camera device the one or more images of objects;
   disposing a power supply in a cavity between a bottom floor and a bottom panel of the flowerpot;
   coupling the bottom panel with the side wall along an outside perimeter of the bottom panel via a seal disposed along the outside perimeter of the bottom panel to prevent water from leaking into the cavity and onto the power supply; and
   electrically coupling the power supply to the camera device with a wire extending along the inner side wall via an opening in the bottom panel.

9. The method as recited in claim 8 further comprising:
   surrounding the camera device with a wall on a back side, top side, a bottom side, a left side, and a right side, and
   sloping downward the wall on the bottom side of the first housing.

10. The method as recited in claim 8 further comprising:
    transmitting with the wireless transmission circuitry in the camera device the one or more images of the captured object in response to a movement of the one or more objects.

11. The method as recited in claim 8 further comprising:
    signaling with a controller the camera device to capture the one or more objects in response to a movement of the one or more objects.

12. The method as recited in claim 8 further comprising:
    removably coupling the power supply to the bottom floor; and
    slidably removing the power supply through a closable opening in the wall of the flowerpot disposed between the bottom floor and the bottom panel.

13. A security planter device comprising:
    a flowerpot forming a shape of a frustrum of a cone with a side wall forming a plurality of camera openings extending through the side wall, the frustrum having a bottom with a floor and having a top with a circular rim, wherein the side wall tapers from the rim to the floor, a disk shaped bottom panel having outside perimeter coupled to the side wall and disposed above the floor, the flowerpot configured to contain a plant and associated soil supported on the bottom panel;
    a plurality of camera devices each encased within a housing, wherein the housing surrounds the camera device with a back side wall, a top side wall, a bottom side wall, a left side wall, and a right side wall, the housings integrally attached to an inner side of the side wall, the camera devices configured to capture one or more images of objects disposed adjacent the flowerpot and viewed through the camera openings, the camera devices having wireless transmission circuitry to transmit the one or more images of the captured object in response to a movement of the one or more objects, in response to a controller to signal the camera devices to capture the one or more objects;

a power supply removably coupled to the floor and configured to be slidably removed through a closable opening in the side wall of the flowerpot disposed between the floor and the bottom panel, the power supply engaging with the bottom floor and disposed in a cavity formed between the floor and the bottom panel of the flowerpot;

at least one wire extending along the inner side wall from the power supply in the cavity to the plurality of camera devices to electrically couple the power supply to the camera devices; and the bottom panel coupling with the side wall along an outside perimeter of the bottom panel, engaging with a seal disposed along the outside perimeter of the bottom panel to prevent water from leaking into the cavity and onto the power supply, and including an opening to enable the at least one wire to extend from the power supply to one or more of the plurality of camera devices.

\* \* \* \* \*